United States Patent
Hamada

(10) Patent No.: US 11,870,326 B2
(45) Date of Patent: Jan. 9, 2024

(54) ELECTRIC DRIVE APPARATUS, AND ELECTRIC POWER STEERING APPARATUS

(71) Applicant: Hitachi Astemo, Ltd., Hitachinaka (JP)

(72) Inventor: Keiji Hamada, Isesaki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/750,093

(22) Filed: May 20, 2022

(65) Prior Publication Data

US 2022/0278590 A1 Sep. 1, 2022

Related U.S. Application Data

(63) Continuation of application No. 16/725,029, filed on Dec. 23, 2019, now Pat. No. 11,362,569, which is a
(Continued)

(30) Foreign Application Priority Data

Jun. 1, 2016 (JP) .................................. 2016-110114

(51) Int. Cl.
*H02K 9/22* (2006.01)
*H02K 11/33* (2016.01)
(Continued)

(52) U.S. Cl.
CPC ................. *H02K 9/02* (2013.01); *H02K 5/18* (2013.01); *H02K 9/22* (2013.01); *H02K 9/227* (2021.01); *H02K 11/33* (2016.01)

(58) Field of Classification Search
CPC .......... H02K 11/33; H02K 11/30; H02K 5/18; H02K 9/02; H02K 9/22
See application file for complete search history.

(56) References Cited

U.S. PATENT DOCUMENTS 6,177,740 B1 1/2001 Burns
6,577,030 B2 6/2003 Tominaga et al.
(Continued)

FOREIGN PATENT DOCUMENTS

JP 2015-134598 A 7/2015

OTHER PUBLICATIONS

Final Office Action on U.S. Appl. No. 15/441,576 dated Mar. 20, 2019.
(Continued)

*Primary Examiner* — Burton S Mullins
(74) *Attorney, Agent, or Firm* — FOLEY & LARDNER LLP

(57) ABSTRACT

In an electric power steering apparatus, a motor housing includes an axial end part opposite to an output part of an electric motor. An electronic control section is arranged at the axial end part of the motor housing. The electronic control section includes a control circuit part, a power supply circuit part, and a power conversion circuit part. The axial end part of the motor housing includes a power conversion part thermal radiation region and a power supply part thermal radiation region. The power conversion circuit part is mounted to the power conversion part thermal radiation region to allow heat to be transferred from the power conversion circuit part to the motor housing. The power supply circuit part is mounted to the power supply part thermal radiation region to allow heat to be transferred from the power supply circuit part to the motor housing.

8 Claims, 5 Drawing Sheets

Related U.S. Application Data continuation of application No. 15/441,576, filed on Feb. 24, 2017, now Pat. No. 10,554,100.

(51) Int. Cl.
  *H02K 5/18* (2006.01)
  *H02K 9/02* (2006.01)

(56) References Cited

U.S. PATENT DOCUMENTS

| | | |
|---|---|---|
| 7,206,204 B2 | 4/2007 | Nakatsu et al. |
| 8,247,937 B2 | 8/2012 | Minato et al. |
| 8,446,111 B2 | 5/2013 | Sonoda et al. |
| 8,576,573 B2 | 11/2013 | Tani |
| 8,803,383 B2 | 8/2014 | Miyachi et al. |
| 8,866,357 B2 | 10/2014 | Yamasaki et al. |
| 9,123,693 B2 | 9/2015 | Tanaka et al. |
| 9,392,732 B2 | 7/2016 | Hara et al. |
| 9,692,350 B2 | 6/2017 | Yamasaki |
| 9,935,520 B2 | 4/2018 | Falguier et al. |
| 2012/0229005 A1* | 9/2012 | Tominaga ............ H02K 11/38 310/68 B |
| 2012/0326292 A1 | 12/2012 | Ohashi et al. |
| 2013/0248277 A1 | 9/2013 | Hagiwara et al. |
| 2014/0225482 A1* | 8/2014 | Hara .................... H02K 11/33 310/68 D |
| 2015/0180316 A1 | 6/2015 | Maeshima |
| 2015/0216083 A1* | 7/2015 | Kanazawa ............ H02K 11/33 361/717 |
| 2016/0065030 A1 | 3/2016 | Fujimoto |
| 2018/0093698 A1* | 4/2018 | Urimoto ............ H02K 15/0062 |

OTHER PUBLICATIONS

Non-Final Office Action on U.S. Appl. No. 15/441,576 dated Oct. 23, 2018.
Non-Final Office Action on U.S. Appl. No. 16/725,029 dated Sep. 20, 2021.
Notice of Allowance on U.S. Appl. No. 15/441,576 dated Oct. 4, 2019.
U.S. Notice of Allowance on U.S. Appl. No. 16/725,029 dated Feb. 17, 2022.

* cited by examiner

ELECTRIC DRIVE APPARATUS, AND ELECTRIC POWER STEERING APPARATUS

CROSS-REFERENCE TO RELATED APPLICATIONS

The present application is a Continuation of U.S. patent application Ser. No. 16/725,029, filed on Dec. 23, 2019, which is a Continuation of U.S. patent application Ser. No. 15/441,576, filed on Feb. 24, 2017, now U.S. Pat. No. 10,554,100, which is based upon and claims the benefit of priority from Japanese Patent Application No. 2016-110114, filed Jun. 1, 2016. The entire contents of all of the above applications are incorporated herein by reference.

BACKGROUND OF THE INVENTION

The present invention relates generally to an electric drive apparatus and an electric power steering apparatus, and particularly to an electric drive apparatus and an electric power steering apparatus in which an electronic control unit is provided.

In recent years, an electric drive apparatus of mechatronical integration type is employed in various industrial fields. This electric drive apparatus includes both of an electric motor and an electronic control unit in a package, wherein the electric motor is configured to drive a controlled object of a mechanical system, and wherein the electronic control unit (ECU) includes semiconductor elements and others for controlling rotational speed and torque of the electric motor. Examples of electric drive apparatus of this type include an electric power steering apparatus, an electric brake apparatus, and an electric hydraulic pressure control apparatus for an automotive vehicle. The electric power steering apparatus of this type includes an electric motor, and an electronic control unit or section for controlling the electric motor, wherein the electronic control unit is configured to receive a sensing signal indicative of rotational speed and torque of a steering shaft rotated by driver's operation of a steering wheel, and control the electric motor based on the sensing signal, to produce a steering assist torque applied to the steering shaft.

Japanese Patent Application Publication No. 2015-134598 (corresponding to US 2015/0180316 A1) discloses an electric power steering apparatus composed integrally of an electric motor section and an electronic control section. In the electric motor section, an electric motor is housed in a motor housing, wherein the motor housing has a cylindrical part made of an aluminum alloy or the like. In the electronic control section, a board provided with electrical components is housed in an electronic control section housing (or ECU housing), wherein the electronic control section housing is arranged at a side of the motor housing opposite to an output shaft of the electric motor in its axial direction. The board is provided with a power supply circuit part, a power conversion circuit part, and a control circuit, wherein the power conversion circuit part includes power switching elements such as MOSFETs (metal-oxide-semiconductor field-effect transistors) or IGBTs (insulated gate bipolar transistors) for driving and controlling the electric motor, and wherein the control circuit part is configured to control the power switching elements. Output terminals of the power switching elements and input terminals of the electric motor are connected electrically via a bus bar.

The electronic control section housed in the electronic control section housing is supplied with electric power from a power supply via a connector terminal assembly made of synthetic resin, and also supplied with a sensing signal indicating operating states and others from sensors and others. The connector terminal assembly serves as a cover covering an opening of the electronic control section housing while being connected to the electronic control section, and fixed to an outer surface of the electronic control section housing by fixing bolts.

SUMMARY OF THE INVENTION

In general, it is demanded that an electric power steering apparatus is made compact, because the electric power steering apparatus is mounted within a limited engine room of an automotive vehicle. This demand is increasing, because many auxiliary devices such as exhaust gas treatment devices and safety enhancement devices are mounted in an engine room of a modern automotive vehicle.

In an electric power steering apparatus as disclosed in Japanese Patent Application Publication No. 2015-134598, a heat sink member is arranged between a motor housing and an ECU housing for radiating heat especially from a power supply circuit part and a power conversion circuit part to the outside. The provision of the heat sink member leads to enlarging the overall axial length of the electric power steering apparatus. Moreover, since electrical components constituting the power supply circuit part and the power conversion circuit part generate a large quantity of heat, it is demanded to efficiently radiate the heat to the outside, especially when the electric power steering apparatus is made compact.

In view of the foregoing, it is desirable to provide an electric drive apparatus and an electric power steering apparatus which are made compact especially in the axial direction and in which heat is efficiently radiated from a power supply circuit part and a power conversion circuit part to the outside.

According to one aspect of the present invention, an electric drive apparatus comprises: a motor housing configured to house an electric motor, wherein the motor housing includes an axial end part opposite to an output part of a rotating shaft of the electric motor, and wherein the electric motor is configured to drive a controlled object of a mechanical system; and an electronic control section arranged at the axial end part of the motor housing, and configured to drive the electric motor, wherein the electronic control section includes a control circuit part, a power supply circuit part, and a power conversion circuit part; wherein the axial end part of the motor housing includes a power conversion part thermal radiation region and a power supply part thermal radiation region; the power conversion circuit part is mounted to the power conversion part thermal radiation region in a manner to allow heat to be transferred from the power conversion circuit part to the motor housing via the power conversion part thermal radiation region; and the power supply circuit part is mounted to the power supply part thermal radiation region in a manner to allow heat to be transferred from the power supply circuit part to the motor housing via the power supply part thermal radiation region.

According to another aspect of the present invention, an electric power steering apparatus comprises: an electric motor configured to apply a steering assist force to a steering shaft, depending on an output from a torque sensor, wherein the torque sensor is configured to sense a direction of rotation of the steering shaft and a rotating torque applied to the steering shaft; a motor housing configured to house the electric motor, wherein the motor housing includes an axial end part opposite to an output part of a rotating shaft of the electric motor; and an electronic control section arranged at the axial end part of the motor housing, and configured to drive the electric motor, wherein the electronic control section includes a control circuit part, a power supply circuit part, and a power conversion circuit part; wherein the axial end part of the motor housing includes a power conversion part thermal radiation region and a power supply part thermal radiation region; the power conversion circuit part is mounted to the power conversion part thermal radiation region in a manner to allow heat to be transferred from the power conversion circuit part to the motor housing via the power conversion part thermal radiation region; and the power supply circuit part is mounted to the power supply part thermal radiation region in a manner to allow heat to be transferred from the power supply circuit part to the motor housing via the power supply part thermal radiation region.

DETAILED DESCRIPTION OF THE INVENTION

In the present embodiment, an electric power steering apparatus is employed as an example of electric drive apparatus.

Figure 1:
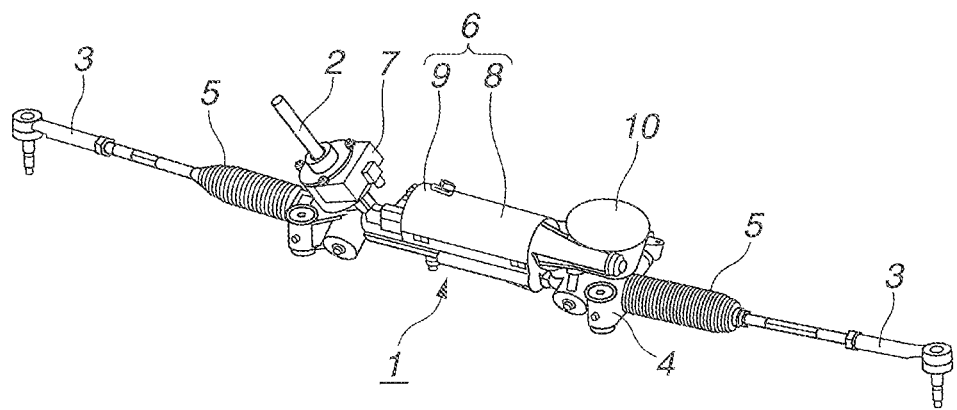
FIG. 1 is a perspective view showing a steering apparatus including an electric power steering apparatus according to an embodiment of the present invention.

FIG. 1 shows a steering apparatus 1 of an automotive vehicle, which includes an electric power steering apparatus 6 according to the present embodiment.

Steering apparatus 1 is configured to steer left and right front wheels of the automotive vehicle. Steering apparatus 1 includes a steering shaft 2 connected to a steering wheel not shown. Steering shaft 2 includes a lower end formed with a pinion not shown, wherein the pinion is in mesh with a rack not shown, wherein the rack extends in a vehicle body lateral direction. The pinion is linked at left and right longitudinal ends to respective tie rods 3, and is housed by a rack housing 4. For each front wheel, a rubber boot 5 is provided between rack housing 4 and tie rod 3.

Electric power steering apparatus 6 is configured to produce a steering assist torque applied to steering shaft 2, while the steering wheel is being turned. Specifically, electric power steering apparatus 6 includes a torque sensor 7, an electric motor section 8, and an electronic control section or unit (ECU) 9. Torque sensor 7 is configured to sense a direction of rotation of steering shaft 2, and a rotating torque applied to steering shaft 2. Electric motor section 8 is configured to apply a steering assist force to the rack via a gear 10, depending on a sensing signal from torque sensor 7. Electronic control section 9 is configured to control an electric motor 50 of electric motor section 8. Electric motor section 8 is connected to gear 10 by three bolts not shown at three spots of an outer peripheral part of an output side of electric motor section 8. Electronic control section 9 is arranged at a side of electric motor section 8 opposite to the output side of electric motor section 8.

Electric power steering apparatus 6 operates as follows. As the steering wheel is turned to rotate steering shaft 2 in one direction, torque sensor 7 then senses the direction of rotation of steering shaft 2, and the rotating torque applied to steering shaft 2. A control circuit part 18 of electronic control section 9 calculates a quantity of operation of electric motor 50, based on the sensing signal from torque sensor 7. Power switching elements of a power conversion circuit part 16 of electronic control section 9 are controlled to drive the electric motor 50 based on the calculated quantity of operation, so that an output shaft of electric motor 50 is rotated to drive the steering shaft 2 in the same direction as the direction of operation of the steering wheel. The rotation of the output shaft of electric motor 50 is transferred to the rack via the pinion and gear 10, thereby steering the left and right front wheels of the automotive vehicle.

Figure 2:
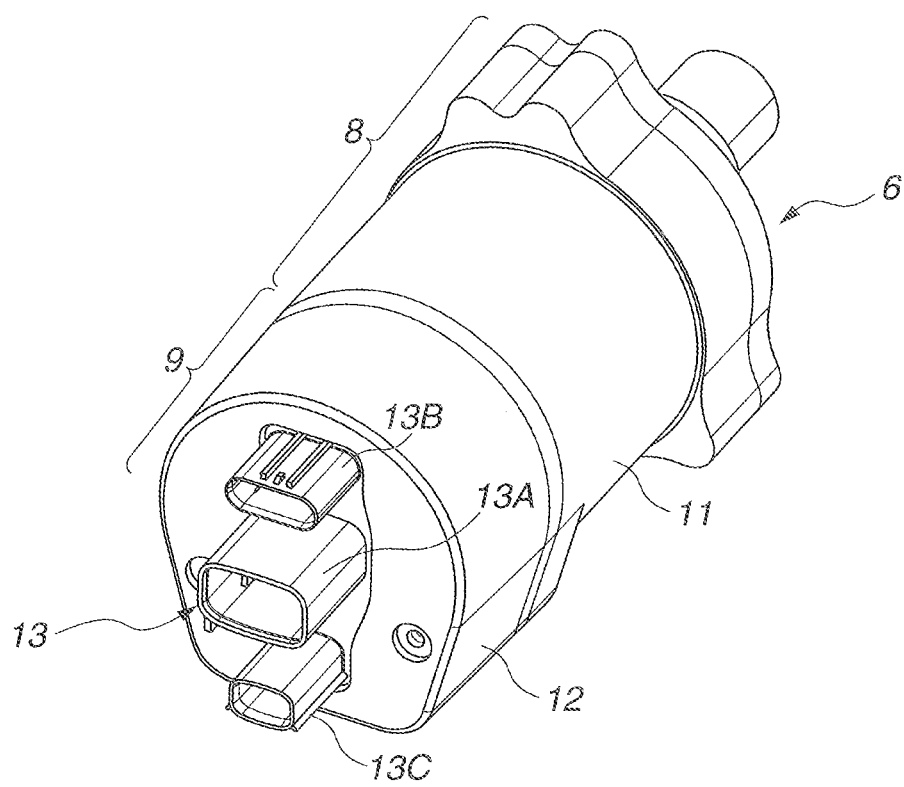
FIG. 2 is a perspective view of the electric power steering apparatus according to the embodiment.
Figure 5:
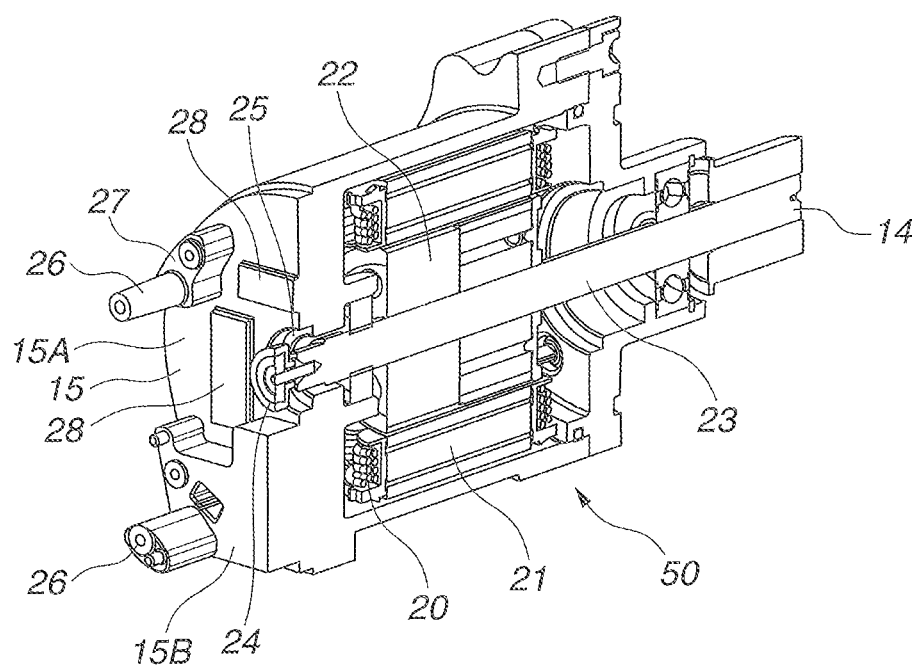
FIG. 5 is a cutaway perspective view of the motor housing of FIG. 4, where the motor housing is cut by a plane containing a central axis of the motor housing.

FIG. 2 shows electric power steering apparatus 6, including the electric motor section 8 and electronic control section 9. Electric motor section 8 includes a motor housing 11 and electric motor 50. Motor housing 11 includes a cylindrical part made of an aluminum alloy or the like. Electric motor 50 is housed in motor housing 11 as shown in FIG. 5. Electronic control section 9 includes a metal cover 12, and an electronic control assembly housed in metal cover 12. Metal cover 12 is made of an aluminum alloy or the like, and is arranged opposite to the output shaft side of motor housing 11 in the axial direction.

Motor housing 11 and metal cover 12 are fixed to each other at their facing end surfaces by bonding, welding, or bolting. Metal cover 12 houses the electronic control assembly, wherein the electronic control assembly includes a power supply circuit part 17 for supplying electric power as required, and power conversion circuit part 16 having power switching elements such as MOSFETs or IGBTs for driving and controlling the electric motor 50 of electric motor section 8, and control circuit part 18 for controlling the power switching elements. Output terminals of the power switching elements and input terminals of a coil 20 of electric motor 50 are connected electrically via a bus bar.

A connector terminal assembly 13 is fixed to an axial end surface of metal cover 12 by fixing bolts. Connector terminal assembly 13 includes a connector terminal forming part 13A for power supply, a connector terminal forming part 13B for sensors, and a connector terminal forming part 13C for sending a state of control to external devices. Connector terminal forming parts 13A, 13B and 13C are made of synthetic resin. The electronic control assembly housed in metal cover 12 is provided with electric power from a power supply via the connector terminal forming part 13A, and is supplied with sensing signals indicative of operating states from sensors via the connector terminal forming part 13B, and sends a present control state of electric power steering apparatus 6 via the connector terminal forming part 13C.

Figure 3:
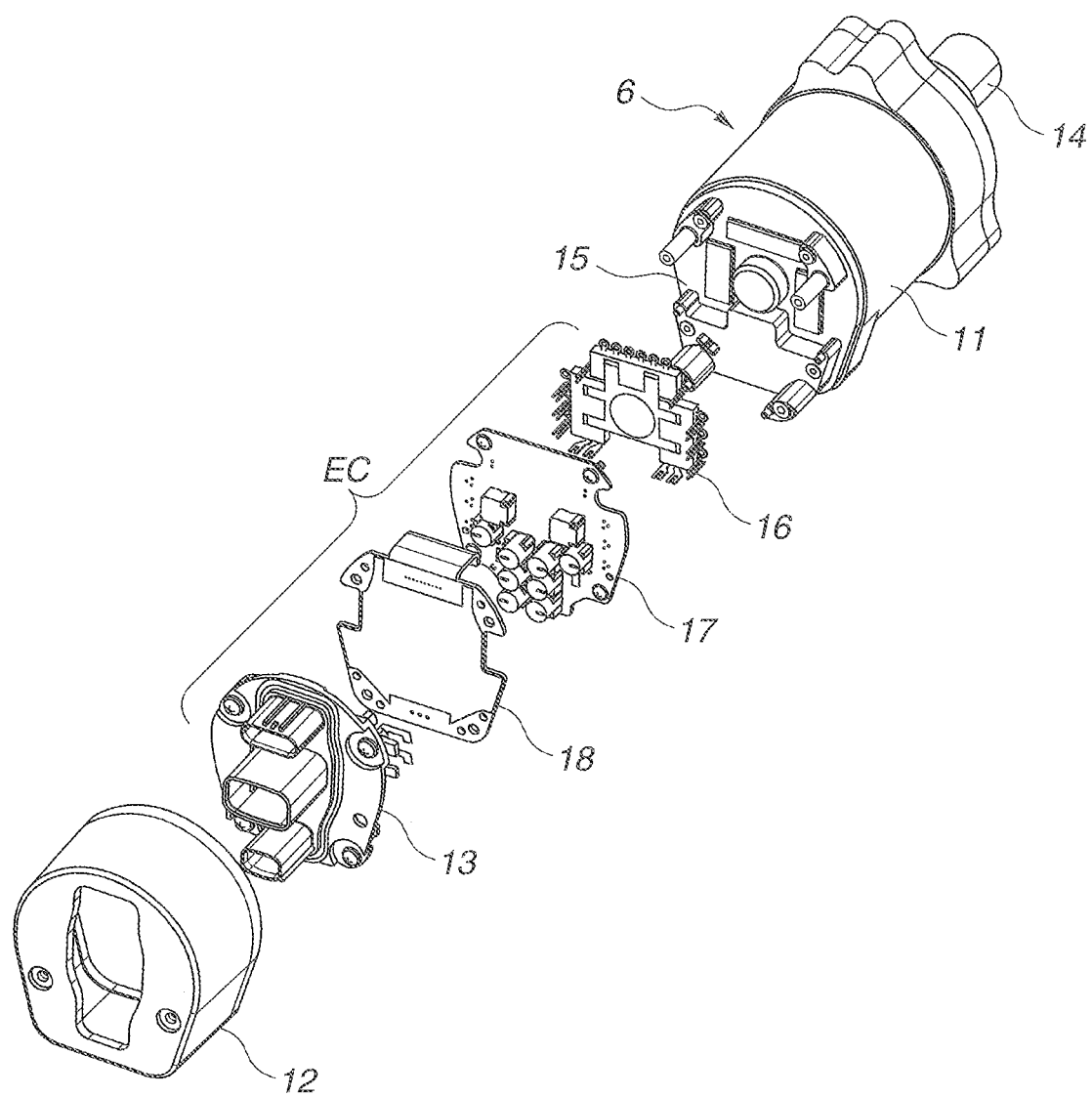
FIG. 3 is an exploded perspective view of the electric power steering apparatus of FIG. 2.

FIG. 3 shows electric power steering apparatus 6 in exploded state. Inside of motor housing 11, a side yoke not shown is fitted, wherein the side yoke has an annular shape and is made of iron. Electric motor 50 is mounted inside of the side yoke. An output part 14 of electric motor 50 is connected to the rack via the gear 10, to apply a steering assist force to the rack.

Motor housing 11 is made of an aluminum alloy, thereby serving as a heat sink member for radiating heat to outside atmosphere, wherein the heat is generated by power conversion circuit part 16 and power supply circuit part 17.

Electronic control assembly EC is attached to an axial end part 15 of motor housing 11 opposite to the output part 14 of electric motor section 8. Electronic control assembly EC includes power conversion circuit part 16, power supply circuit part 17, and control circuit part 18. The axial end part 15 of motor housing 11 is formed integrally with the cylindrical part of motor housing 11 in this example, but may be formed separately from the cylindrical part of motor housing 11 and bolted or welded to the cylindrical part of motor housing 11.

Electronic control assembly EC is composed of redundant systems, namely, a main electronic control system and an auxiliary electronic control system. Normally, the main electronic control system is employed to drive and control the electric motor 50. When an abnormality or failure occurs in the main electronic control system, the control is switched from the main electronic control system to the auxiliary electronic control system so that the auxiliary electronic control system drives and controls the electric motor 50.

Accordingly, under normal conditions, heat is generated by the main electronic control system of electronic control assembly EC, and the heat is transferred to motor housing 11. On the other hand, under abnormal or failed conditions, heat is generated by the auxiliary electronic control system of electronic control assembly EC, and the heat is transferred to motor housing 11.

The configuration described above may modified so that both of the main and auxiliary electronic control systems of electronic control assembly EC are simultaneously employed to form a normal electronic control system, and when one of the main and auxiliary electronic control systems is failed or abnormal, only the other electronic control system is employed to drive and control the electric motor 50 with half of full performance. This ensures a limp-home function, although the performance of electric motor 50 is only half. In this modification, normally, both of the main and auxiliary electronic control systems of electronic control assembly EC generate heat, and the heat is transferred to motor housing 11.

As described above, electronic control assembly EC is composed of power conversion circuit part 16, power supply circuit part 17, control circuit part 18, and connector terminal assembly 13, which are arranged in this order away from axial end part 15 of motor housing 11. Control circuit part 18 is configured to generate control signals for driving the switching elements of power conversion circuit part 16, and includes a microcomputer 32, and a peripheral circuit 33. Power supply circuit part 17 is configured to supply electric power for driving the control circuit part 18 and electric power for driving the power conversion circuit part 16. Power supply circuit part 17 includes a capacitor 29, coil 30, switching elements, and others. Power conversion circuit part 16 is configured to regulate electric power flowing through the coil 20 of electric motor 50, and includes switching elements and others forming three-phase upper and lower arms.

In electronic control assembly EC, power conversion circuit part 16 and power supply circuit part 17 generate more quantities of heat than others. The generated heat is transferred and radiated to motor housing 11.

Connector terminal assembly 13, which is made of synthetic resin, is arranged between control circuit part 18 and metal cover 12, and is connected to external control devices not shown, and configured to send current states of operation of a vehicle battery (power supply) and electric power steering apparatus 6 thereto. Connector terminal assembly 13 is also connected to power conversion circuit part 16, power supply circuit part 17, and control circuit part 18.

Metal cover 12 houses and seals liquid-tightly the power conversion circuit part 16, power supply circuit part 17, and control circuit part 18. In this example, metal cover 12 is welded to motor housing 11. Since metal cover 12 is made of metal, metal cover 12 serves also to radiate the heat from power conversion circuit part 16 and power supply circuit part 17 to the outside.

Figure 4:
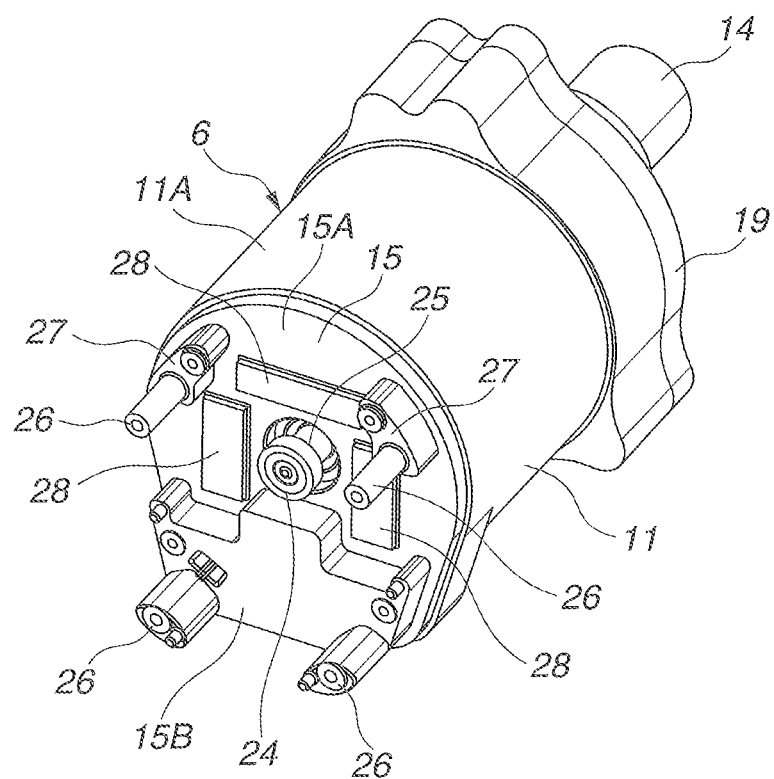
FIG. 4 is a perspective view of a motor housing of the electric power steering apparatus of FIG. 3.

The following describes specific configuration of the components and a process of assembling the components with reference to FIGS. 4 to 8. As shown in FIGS. 4 and 5, motor housing 11 includes a lateral peripheral surface part 11A, axial end part 15, and an axial end part 19. The lateral peripheral surface part 11A is cylindrically shaped. The axial end part 15 closes one axial end of lateral peripheral surface part 11A, whereas the axial end part 19 closes the other axial end of lateral peripheral surface part 11A. In this example, lateral peripheral surface part 11A and axial end part 15 are formed integrally to form a cylindrical shape having a bottom. The axial end part 19 serves as a cover for covering one axial end of lateral peripheral surface part 11A after electric motor 50 is mounted inside the lateral peripheral surface part 11A.

As shown in FIG. 5, a stator 21 is fitted inside the lateral peripheral surface part 11A of motor housing 11, wherein stator 21 is formed by winding the coil 20 around an iron core. A rotor 22 is rotatably mounted inside the stator 21, wherein a permanent magnet is embedded in rotor 22. A rotating shaft 23 is fixed to rotor 22. One axial end of rotating shaft 23 forms the output part 14, whereas the other axial end of rotating shaft 23 forms a rotation-sensing target part 24 serving as a target for sensing the rotational phase and speed of rotating shaft 23. Rotation-sensing target part 24 is provided with a permanent magnet, extending through a through hole 25 formed in axial end part 15, and projecting to the outside. The rotational phase and speed of rotating shaft 23 is sensed by a magnet-sensing part such as a GMR (giant magneto resistive effect) element or the like not shown.

Referring back to FIG. 4, the surface of axial end part 15 opposite to the output part 14 of rotating shaft 23 is formed with thermal radiation regions 15A and 15B for power conversion circuit part 16 and power supply circuit part 17. Four corners of axial end part 15 are formed integrally with board-fixing projecting parts 26, each of which extends perpendicularly from the remaining portion of axial end part 15. Each board-fixing projecting part 26 is formed with a threaded hole inside. Board-fixing projecting parts 26 are configured to fix a glass epoxy board 34 of control circuit part 18. Each board-fixing projecting part 26 projecting from power conversion part thermal radiation region 15A is formed with a board-receiving part 27 having the same height as power supply part thermal radiation region 15B in the axial direction. Board-receiving part 27 is configured to mounting a glass epoxy board 31 of power supply circuit part 17. The flat area forming the axial end part 15 and extending in the radial direction and perpendicular to rotating shaft 23 is divided into two regions, namely, power conversion part thermal radiation region 15A and power supply part thermal radiation region 15B. Power conversion circuit part 16 is attached to power conversion part thermal radiation region 15A. Power supply circuit part 17 is attached to power supply part thermal radiation region 15B. In this example, the area of power conversion part thermal radiation region 15A is set larger than that of power supply part thermal radiation region 15B, for ensuring more space for mounting the power conversion circuit part 16, because power conversion circuit part 16 includes redundant systems, and thereby requires a sufficient mounting space.

The axial end part 15 of motor housing 11 includes a step between power conversion part thermal radiation region 15A and power supply part thermal radiation region 15B such that power conversion part thermal radiation region 15A and power supply part thermal radiation region 15B have different heights in the axial direction (the direction in which rotating shaft 23 extends). Namely, power supply part thermal radiation region 15B is formed with an outward step away from electric motor 50 with respect to power conversion part thermal radiation region 15A in the axial direction of rotating shaft 23 of electric motor 50. This step is set to have a height enough to prevent interference between power conversion circuit part 16 and power supply circuit part 17 when power supply circuit part 17 is assembled after power conversion circuit part 16 is assembled.

Power conversion part thermal radiation region 15A is formed with three thermal radiation projecting parts 28, wherein each thermal radiation projecting part 28 has a narrow rectangular shape as viewed in the axial direction. Thermal radiation projecting parts 28 are configured to mount power conversion circuit part 16 thereon. Each thermal radiation projecting part 28 projects away from electric motor 50 in the axial direction of rotating shaft 23 of electric motor 50.

Power supply part thermal radiation region 15B is generally flat and is configured to mount power supply circuit part 17 thereon. Accordingly, each thermal radiation projecting part 28 serves as a thermal radiation part to transfer heat from power conversion circuit part 16 to axial end part 15 of motor housing 11, whereas power supply part thermal radiation region 15B serves as a thermal radiation part to transfer heat from power supply circuit part 17 to axial end part 15 of motor housing 11.

Each thermal radiation projecting part 28 may be omitted so that power conversion part thermal radiation region 15A is in direct contact with power conversion circuit part 16 and serves as a thermal radiation part to transfer heat from power conversion circuit part 16 to axial end part 15 of motor housing 11. However, in this example, each thermal radiation projecting part 28 is employed to fix tightly a metal board of power conversion circuit part 16 by friction stir welding.

With the configuration described above, the overall size of electric power steering apparatus 6 is made compact, because there is no heat sink member at axial end part 15 of motor housing 11. Moreover, since motor housing 11 has a sufficient thermal capacity, and thereby functions as a radiator, the heat generated in power supply circuit part 17 and power conversion circuit part 16 can be radiated to the outside effectively.

Figure 6:
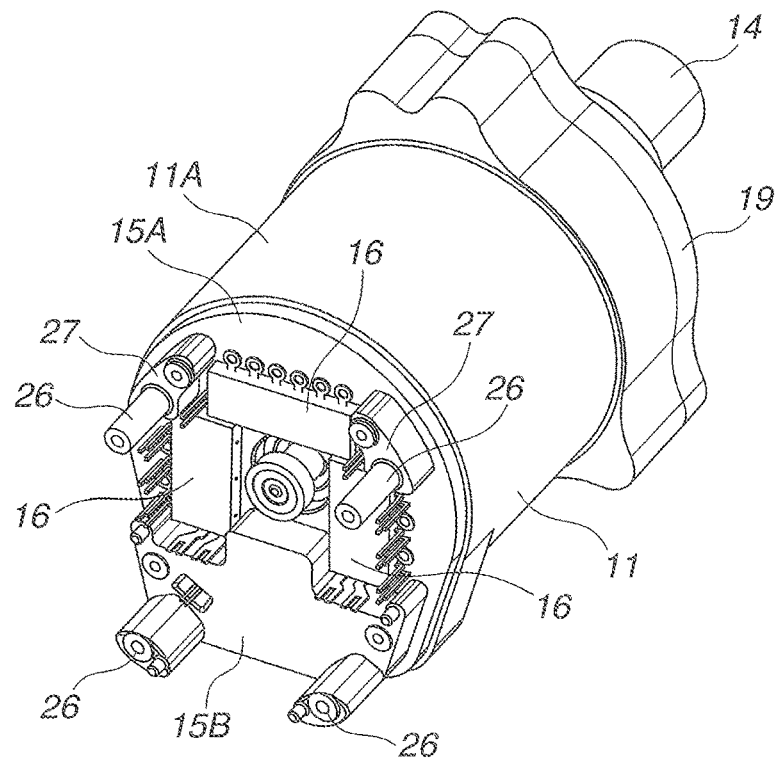
FIG. 6 is a perspective view of the motor housing of FIG. 4 where a power conversion circuit part is mounted to the motor housing.

FIG. 6 shows electric power steering apparatus 6 in the state where power conversion circuit part 16 composed of redundant systems is placed on thermal radiation projecting parts 28 of power conversion part thermal radiation region 15A. The switching elements constituting the power conversion circuit part 16 are placed on the metal board which is made of aluminum or the like in this example, allowing the generated heat to be radiated. The metal board of power conversion circuit part 16 is welded to thermal radiation projecting parts 28 by friction stir welding.

The configuration described above serves to fix the metal board of power conversion circuit part 16 on thermal radiation projecting parts 28 tightly, and allow the heat from the switching elements of power conversion circuit part 16 to thermal radiation projecting parts 28 effectively. The heat is further transferred from thermal radiation projecting parts 28 to power conversion part thermal radiation region 15A, and then lateral peripheral surface part 11A of motor housing 11. Power conversion circuit part 16 is prevented from interfering with power supply circuit part 17, because the height of power conversion circuit part 16 is shorter than power supply part thermal radiation region 15B in the axial direction.

Figure 7:
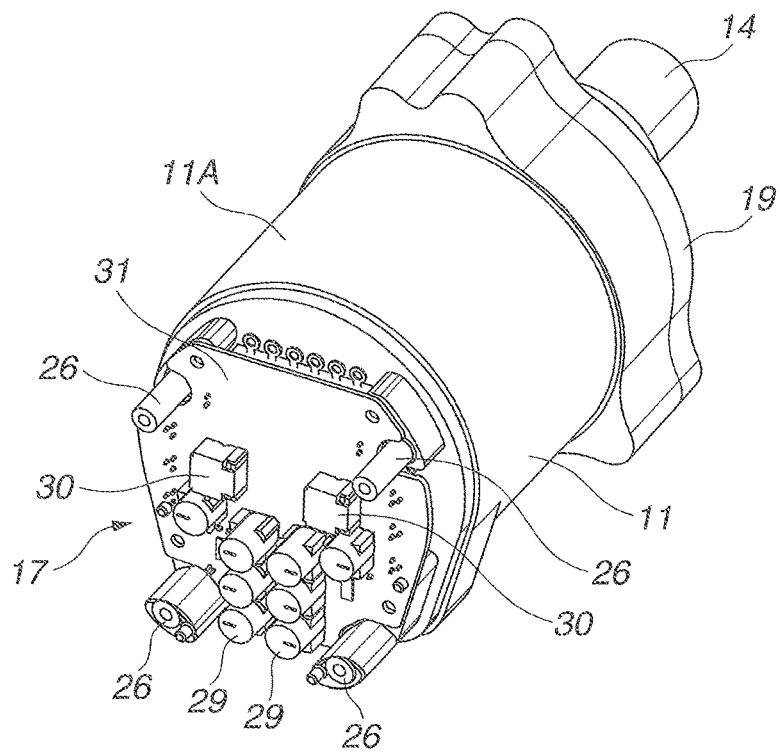
FIG. 7 is a perspective view of the motor housing of FIG. 4 where a power supply circuit part is mounted to the motor housing.

FIG. 7 shows electric power steering apparatus 6 in the state where power supply circuit part 17 is placed over power conversion circuit part 16. As shown in FIG. 7, power supply part thermal radiation region 15B is covered by power supply circuit part 17. Power supply circuit part 17 includes glass epoxy board 31, and capacitor 29, coil 30 and others placed on glass epoxy board 31. Similar to power conversion circuit part 16, power supply circuit part 17 includes redundant systems, each of which includes capacitor 29 and coil 30 respectively as shown in FIG. 7.

The surface of glass epoxy board 31 facing the power supply part thermal radiation region 15B is fixed to axial end part 15 in contact with power supply part thermal radiation region 15B. This fixing is implemented by bolting with a fixing bolt through a threaded hole formed in each board-receiving part 27 of board-fixing projecting part 26, and also with a fixing bolt through a threaded hole formed in power supply part thermal radiation region 15B.

The configuration that power supply circuit part 17 is based on glass epoxy board 31 allows the components of power supply circuit part 17 to be mounted on both sides of the power supply circuit part 17. The surface of glass epoxy board 31 facing the power supply part thermal radiation region 15B is provided with a sensing part for sensing the rotational phase and speed of rotating shaft 23, such as a GMR element and a sensing circuit, in cooperation with rotation-sensing target part 24 of rotating shaft 23.

The configuration that glass epoxy board 31 is fixed to power supply part thermal radiation region 15B in intimate contact with power supply part thermal radiation region 15B, allows the heat to be transferred from power supply circuit part 17 to power supply part thermal radiation region 15B effectively. The heat transferred to power supply part thermal radiation region 15B is transferred and spread into lateral peripheral surface part 11A of motor housing 11, and then radiated to the outside. In order to enhance the thermal conductivity, an adhesive agent or radiation grease or radiation sheet having a high thermal conductivity may be disposed between glass epoxy board 31 and power supply part thermal radiation region 15B.

Figure 8:
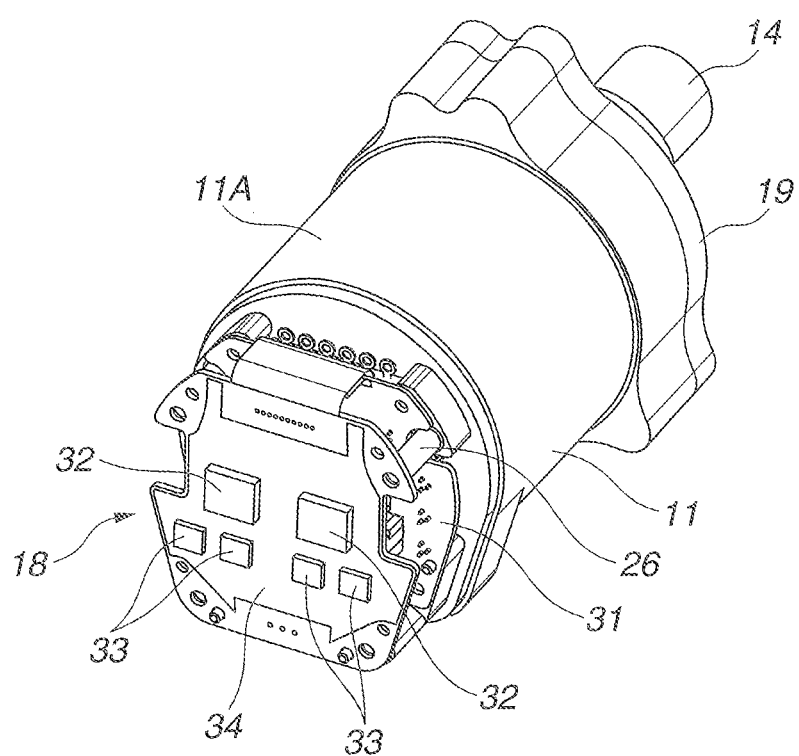
FIG. 8 is a perspective view of the motor housing of FIG. 4 where a control circuit part is mounted to the motor housing.

FIG. 8 shows electric power steering apparatus 6 in the state where control circuit part 18 is placed over the power supply circuit part 17. The components of control circuit part 18, namely, microcomputer 32, peripheral circuit 33, and others are placed on glass epoxy board 34. Similar to power conversion circuit part 16 and power supply circuit part 17, control circuit part 18 includes redundant systems, each of which includes microcomputer 32 and peripheral circuit 33 as shown in FIG. 8. Microcomputer 32 and peripheral circuit 33 may be placed on the surface of glass epoxy board 34 facing the power supply circuit part 17.

Glass epoxy board 34 is fixed by fixing bolts through the threaded holes formed in the top portion of board-fixing projecting parts 26. The space between glass epoxy board 31 of power supply circuit part 17 and glass epoxy board 34 of control circuit part 18 is used for arrangement of capacitor 29, coil 30 and others.

Subsequently, as shown in FIG. 3, connector terminal assembly 13 is connected to power conversion circuit part 16, power supply circuit part 17, control circuit part 18, and metal cover 12 is attached to motor housing 11 to seal liquid-tightly the power conversion circuit part 16, power supply circuit part 17, and control circuit part 18. Assembling of electric power steering apparatus 6 is thus completed.

In summary, according to one aspect of the present embodiment, an electric drive apparatus includes: a motor housing (11) configured to house an electric motor (50), wherein the motor housing (11) includes an axial end part (15) opposite to an output part (14) of a rotating shaft (23) of the electric motor (50), and wherein the electric motor (50) is configured to drive a controlled object (2) of a mechanical system (1); and an electronic control section (9) arranged at the axial end part (15) of the motor housing (11), and configured to drive the electric motor (50), wherein the electronic control section (9) includes a control circuit part (18), a power supply circuit part (17), and a power conversion circuit part (16); wherein the axial end part (15) of the motor housing (11) includes a power conversion part thermal radiation region (15A) and a power supply part thermal radiation region (15B); the power conversion circuit part (16) is mounted to the power conversion part thermal radiation region (15A) in a manner to allow heat to be transferred from the power conversion circuit part (16) to the motor housing (11) via the power conversion part thermal radiation region (15A); and the power supply circuit part (17) is mounted to the power supply part thermal radiation region (15B) in a manner to allow heat to be transferred from the power supply circuit part (17) to the motor housing (11) via the power supply part thermal radiation region (15B).

The electric drive apparatus is further configured such that the axial end part (15) of the motor housing (11) includes a step between the power supply part thermal radiation region (15B) and the power conversion part thermal radiation region (15A) such that the power supply part thermal radiation region (15B) projects outwardly in an axial direction of the motor housing (11) with respect to the power conversion part thermal radiation region (15A). The electric drive apparatus is further configured such that: the power conversion part thermal radiation region (15A) includes a thermal radiation projecting part (28) projecting outwardly in the axial direction of the motor housing (11); and the thermal radiation projecting part (28) is in contact with the power conversion circuit part (16). The electric drive apparatus is further configured such that the power conversion circuit part (16), the power supply circuit part (17), and the control circuit part (18) are arranged in this order away from the motor housing (11) in the axial direction of the motor housing (11).

According to another aspect of the present embodiment, an electric power steering apparatus includes: an electric motor (50) configured to apply a steering assist force to a steering shaft (2), depending on an output from a torque sensor (7), wherein the torque sensor (7) is configured to sense a direction of rotation of the steering shaft (2) and a rotating torque applied to the steering shaft (2); a motor housing (11) configured to house the electric motor (50), wherein the motor housing (11) includes an axial end part (15) opposite to an output part (14) of a rotating shaft (23) of the electric motor; and an electronic control section (9) arranged at the axial end part (15) of the motor housing (11), and configured to drive the electric motor (50), wherein the electronic control section (9) includes a control circuit part (18), a power supply circuit part (17), and a power conversion circuit part (16); wherein the axial end part (15) of the motor housing (11) includes a power conversion part thermal radiation region (15A) and a power supply part thermal radiation region (15B); the power conversion circuit part (16) is mounted to the power conversion part thermal radiation region (15A) in a manner to allow heat to be transferred from the power conversion circuit part (16) to the motor housing (11) via the power conversion part thermal radiation region (15A); and the power supply circuit part (17) is mounted to the power supply part thermal radiation region (15B) in a manner to allow heat to be transferred from the power supply circuit part (17) to the motor housing (11) via the power supply part thermal radiation region (15B).

With the configuration described above, the heat generated in power supply circuit part 17 and power conversion circuit part 16 is transferred to axial end part 15 of motor housing 11, allowing to omit a heat sink member, and shorten the overall size of electric power steering apparatus 6 in the axial direction. Moreover, since motor housing 11 has a sufficient thermal capacity, and thereby functions as a radiator, the heat generated in power supply circuit part 17 and power conversion circuit part 16 can be radiated to the outside effectively.

The entire contents of Japanese Patent Application 2016-110114 filed Jun. 1, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electric drive apparatus comprising:
 a motor housing configured to house an electric motor, wherein the electric motor includes a stator, a rotor, and a rotating shaft fixed to the rotor, and is configured to drive a controlled object of a mechanical system;
 a permanent magnet provided at an axial end of a rotating shaft of the electric motor;
 a board arranged to face the axial end of the rotating shaft, and provided with a first electrical component and a sensing part for sensing rotation of the rotating shaft in cooperation with the permanent magnet; and
 a second electrical component;
 wherein the motor housing includes an axial end part having an outer face facing away from the electric motor, wherein the outer face of the axial end part includes a step between a first level and a second level of the outer face of the axial end part such that the second level is higher in an axial direction of the motor housing than the first level;
 the board is placed on the second level of the axial end part of the motor housing;
 the second electrical component is placed on the first level of the axial end part of the motor housing and apart from the board such that the second electrical component is closer to the electric motor than the second level of the axial end part of the motor housing; and the permanent magnet projects toward the board with respect to the first level of the axial end part of the motor housing.

2. The electric drive apparatus as claimed in claim 1, wherein the first electrical component constitutes a power supply circuit part.

3. An electric drive apparatus comprising:
a motor housing configured to house an electric motor, wherein the electric motor includes a stator, a rotor, and a rotating shaft fixed to the rotor, and is configured to drive a controlled object of a mechanical system;
a permanent magnet provided at an axial end of a rotating shaft of the electric motor;
a board arranged to face the axial end of the rotating shaft, and provided with a first electrical component and a sensing part for sensing rotation of the rotating shaft in cooperation with the permanent magnet;
an axial end part formed separately from the motor housing, and arranged at an axial end of the motor housing, and having an electronic control section side facing away from the electrical motor, wherein the electronic control section side of the axial end part includes a step between a first level and a second level of the electronic control section side of the axial end part such that the second level is higher in an axial direction of the motor housing than the first level; and
a second electrical component;
wherein the board is placed on the second level of the axial end part of the motor housing;
the second electrical component is placed on the first level of the axial end part of the motor housing and apart from the board such that the second electrical component is closer to the electric motor than the second level of the axial end part of the motor housing; and
the permanent magnet projects toward the board with respect to the first level of the axial end part of the motor housing.

4. The electric drive apparatus as claimed in claim 3, wherein the first electrical component constitutes a power supply circuit part.

5. An electric drive apparatus comprising:
a motor housing configured to house an electric motor, wherein the electric motor includes a stator, a rotor, and a rotating shaft fixed to the rotor, and is configured to drive a controlled object of a mechanical system;
a permanent magnet provided at an axial end of a rotating shaft of the electric motor;
a board arranged to face the axial end of the rotating shaft, and provided with a first electrical component and a sensing part for sensing rotation of the rotating shaft in cooperation with the permanent magnet; and
a second electrical component;
wherein the motor housing includes an axial end part having an outer face facing away from the electric motor, wherein the other face of the axial end part includes a step between a first level and a second level of the outer face of the axial end part such that the second level is higher in an axial direction of the motor housing than the first level;
the board is placed on the second level of the axial end part of the motor housing, and fixed to a board-receiving part and the second level of the axial end part of the motor housing, wherein the board-receiving part is located at the first level of the axial end part of the motor housing;
the second electrical component is placed on the first level of the axial end part of the motor housing and apart from the board such that the second electrical component is closer to the electric motor than the second level of the axial end part of the motor housing; and
the permanent magnet projects toward the board with respect to the first level of the axial end part of the motor housing.

6. The electric drive apparatus as claimed in claim 5, wherein the first electrical component constitutes a power supply circuit part.

7. An electric drive apparatus comprising:
a motor housing configured to house an electric motor, wherein the electric motor includes a stator, a rotor, and a rotating shaft fixed to the rotor, and is configured to drive a controlled object of a mechanical system;
a permanent magnet provided at an axial end of a rotating shaft of the electric motor;
a board arranged to face the axial end of the rotating shaft, and provided with a first electrical component and a sensing part for sensing rotation of the rotating shaft in cooperation with the permanent magnet, wherein the first electrical component constitutes a power supply circuit part; and
a second electrical component that generates heat;
wherein the motor housing includes an axial end part having an outer face facing away form the electric motor, wherein the outer face of the axial end part includes a step between a first level and a second level of the outer face of the axial end part such that the second region is higher in an axial direction of the motor housing than the first level;
the permanent magnet projects toward the board with respect to the first level of the axial end part of the motor housing;
the first electrical component corresponds in position to the second level of the axial end part of the motor housing;
the second electrical component is placed on the first level of the axial end part of the motor housing and apart from the board such that heat generated by the second electrical component is transferred to the first level of the axial end part of the motor housing.

8. An electric drive apparatus comprising:
a motor housing configured to house an electric motor, wherein the electric motor includes a stator, a rotor, and a rotating shaft fixed to the rotor, and is configured to drive a controlled object of a mechanical system;
a permanent magnet provided at an axial end of a rotating shaft of the electric motor;
an electronic control section arranged at the axial end of the rotating shaft of the electric motor, and configured to control the electric motor, wherein the electronic control section includes a board provided with a first electrical component and a sensing part for sensing rotation of the rotating shaft in cooperation with the permanent magnet;
a cover fixed to the motor housing to house and seal liquid-tightly the electronic control section; and
a second electrical component;
wherein the motor housing includes an axial end part having an outer face facing away from the electric motor, wherein the outer face of the axial end part includes a step between a first level and a second level of the outer face of the axial end part such that the second level is higher in an axial direction of the motor housing than the first level;

the board is placed on the second level of the axial end part of the motor housing;

the second electrical component is placed on the first level of the axial end part of the motor housing and apart from the board such that the second electrical component is closer to the electric motor than the second level of the axial end part of the motor housing; and the permanent magnet projects toward the board with respect to the first level of the axial end part of the motor housing.

* * * * *